US007936882B2

(12) United States Patent
Junod et al.

(10) Patent No.: US 7,936,882 B2
(45) Date of Patent: May 3, 2011

(54) METHOD TO TRACE TRACEABLE PARTS OF ORIGINAL PRIVATE KEYS IN A PUBLIC-KEY CRYPTOSYSTEM

(75) Inventors: Pascal Junod, Vufflens-la-Ville (CH); Alexandre Karlov, Meyrin (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 759 days.

(21) Appl. No.: 12/016,031

(22) Filed: Jan. 17, 2008

(65) Prior Publication Data

US 2009/0185686 A1    Jul. 23, 2009

(51) Int. Cl.
*H04L 9/30* (2006.01)
(52) U.S. Cl. ............................................ 380/277; 380/30
(58) Field of Classification Search .................. None
See application file for complete search history.

(56) References Cited

U.S. PATENT DOCUMENTS

| | | | |
|---|---|---|---|
| 4,417,338 A * | 11/1983 | Davida .......................... | 380/286 |
| 4,633,470 A | 12/1986 | Welch et al. | |
| 7,010,125 B2 | 3/2006 | Lotspiech et al. | |
| 7,039,803 B2 | 5/2006 | Lotspiech et al. | |
| 2003/0192005 A1* | 10/2003 | Williamson et al. .......... | 714/758 |
| 2006/0153377 A1* | 7/2006 | Arditti Modiano .......... | 380/200 |
| 2008/0075287 A1* | 3/2008 | Boneh et al. .................. | 380/277 |
| 2009/0180619 A1* | 7/2009 | Furukawa et al. ............. | 380/277 |

OTHER PUBLICATIONS

Boneh, D., et al., "An Efficient Public Key Traitor Tracing Scheme (Extended Abstract)," Crypto'99, Lecture Notes in Computer Sciences 1666, pp. 338-353, Springer-Verlag, 1999.

Chien, R.T., "Cyclic Decoding Procedures for Bose-Chaudhuri-Hocquenghem Codes," IEEE Transactions on Information Theory, vol. IT-10, pp. 357-363, 1964.

Chor, B., et al., "Tracing Traitors," Crypto'94, Lecture Notes in Computer Sciences 839, pp. 257-270, Springer-Verlag, 1994.

Fiat, A., et al., "Broadcast Encryption," Crypto'93, Lecture Notes in Computer Sciences 773, pp. 480-491, Springer-Verlag, 1994.

(Continued)

*Primary Examiner* — David J Pearson
(74) *Attorney, Agent, or Firm* — DLA Piper LLP US

(57) ABSTRACT

The aim of the present invention is to propose a very fast alternative mechanism to the traitor tracing algorithm introduced by Boneh and Franklin to trace private keys in a public-key cryptosystem. This invention concerns a method to trace traceable parts of original private keys in a public-key cryptosystem consisting of one public key and $\lambda$ corresponding private keys, a private key being formed by a traceable array of $2k$ elements forming a syndrome of a generalized Reed-Solomon code with parameters $(\lambda, \lambda-2k)$ defined by the base points $\vec{\pi} = (\pi_1, \ldots, \pi_\lambda)$ and a scaling vector $\vec{c} = (c_1, c_2, \ldots, c_\lambda)$, comprising the steps of: obtaining the traceable part $\vec{d} = (d_1, \ldots, d_{2k})^T$ of a rogue private key, applying a Berlekamp-Massey algorithm on the traceable part $\vec{d} = (d_1, \ldots, d_{2k})^T$ of the rogue private key, to obtain the k coefficients of an error-locator polynomial, applying the Chien's search algorithm to the error-locator polynomial, to obtain roots of the error-locator polynomial, determining the base points of the traceable part of the original private keys by computing the arithmetic inverse of each root, these base points allowing to uniquely determine the private key.

4 Claims, 1 Drawing Sheet

OTHER PUBLICATIONS

Kiayias, A., et al., "Pirate Evolution: How to Make the Most of Your Traitor Keys," Crypto'07, Lecture Notes in Computer Sciences 4622, pp. 448-465, Springer-Verlag, 2007.

Massey, James L., "Shift-Register Synthesis and BCH Decoding," IEEE Transactions on Information Theory, vol. 15, No. 1, pp. 122-127, 1969.

Kurosawa, K, et al., "Linear Code Implies Public-Key Traitor Tracing," Lecture Notes in Computer Science, vol. 2274, pp. 172-187, Springer Verlag, 2002.

Matsushita, T, et al., "A Flexible-Revocation Scheme for Efficient Public-Key Black-Box Traitor Tracing," IEICE Trans. Fundamentals, vol. E88-A, No. 4, pp. 1055-1062, 2005.

\* cited by examiner

METHOD TO TRACE TRACEABLE PARTS OF ORIGINAL PRIVATE KEYS IN A PUBLIC-KEY CRYPTOSYSTEM

FIELD OF THE INVENTION

The aim of the present invention is to propose a very fast alternative mechanism to the traitor tracing algorithm introduced by Boneh and Franklin to trace private keys in a public-key cryptosystem.

PRIOR ART

Consider the following scenario: a management center would like to broadcast some data to l receivers, where only authorized users (typically, those who have paid a fee) can have access to the data. A possible solution, widely deployed in commercial Pay-TV systems or in secured media distribution systems, for instance, consists in encrypting the data using a symmetric key and to securely transmit to each authorized receiver this key which will be stored in a tamper-proof piece of hardware, like a smartcard.

Unfortunately, tamper-resistant hardware is very difficult and/or costly to design, since it is vulnerable to a wide variety of attacks. Therefore, a malicious user (hereafter called a traitor) can try to retrieve the decryption key from his receiver and distribute it (sell or give away) to unauthorized users (the pirates). Depending on the nature of the encryption schemes in use, we can even imagine situations where a dishonest user will try to mix several legitimate keys in order to build a new one and embed it in a pirate receiver device.

The problem of identifying which receivers were compromised and/or which secret keys were leaked is called traitor tracing. Usually, two modes of traitor tracing are considered: in the black-box mode, the tracing algorithm sends crafty ciphertexts to the rogue receiver and aims at determining which keys it uses while observing its behavior; in the non-black-box model, we assume that the keys (or their combination) can be extracted from the pirate receiver and are known to the tracing algorithm.

Fiat and Naor [1] introduced the concept of broadcast encryption. In their model, there exists a set of $\lambda$ authorized users and the broadcasting center can dynamically specify a privileged subset of authorized users that can decrypt selected ciphertexts (like high-value content, for instance). Later on, Chor, Fiat, and Naor [2] introduced the concept of traitor-tracing to thwart the problem of decryption keys piracy in broadcast encryption schemes; their scheme is k-collusion resistant (or k-resilient) in the sense that at least one traitor is identified with very high probability if there are at most k of them. Later on, Naor, Naor and Lotspiech [3, 4] presented more efficient broadcast encryption schemes with tracing capabilities; it was however shown by Kiayias and Pehlivanoglu [5] that the iterative nature of the tracing procedure allows a pirate to significantly leverage the compromise of a few keys.

Boneh and Franklin [6] proposed a new public-key traitor-tracing scheme based on error-correcting codes, more precisely on Reed-Solomon codes. The Boneh-Franklin non-black-box traitor tracing scheme is k-collusion resistant and deterministic in the sense that all of the traitors are identified with probability 1 as long as at most k of them collude to derive new pirate keys.

Background on Generalized Reed-Solomon Codes

A linear code C over $GF(q)^\lambda$ vector space is a subspace of $GF(q)^\lambda$. As such, C has a dimension $0 \leq 2k \leq \lambda$ and contains $q^{2k}$ codewords. The minimal distance d of C is equal to the minimum Hamming weight of all non-zero codewords. An $\lambda \times 2k$ matrix G over $GF(q)$ is called a generator matrix if its columns form a linearly independent basis for C. Conversely, given a matrix G over $GF(q)$, we can associate to it the code $C = \{\vec{y} \in GF(q)^l : \vec{y} = xG \text{ where } x \in GF(q)^k\}$. A reduced parity-check matrix H is a $(\lambda - 2k) \times \lambda$ matrix with elements in $GF(q)$ such that a vector $\vec{x} \in GF(q)^\lambda$ is a codeword (i.e., $\vec{x} \in C$) just when $\vec{x} H^T = 0$. Receiving a noisy codeword $\vec{x}'$, the vector $\vec{s} = \vec{x}' H^T$ is called the syndrome. Writing $\vec{x}' = \vec{x} + \vec{e}$, where $\vec{e}$ is called the error pattern, it could be observed that the syndrome $\vec{s} = (\vec{x} + \vec{e}) H^T = 0 + \vec{e} H^T = \vec{e} H^T$ depends only on the error pattern, and not on the codeword itself. A generalized Reed-Solomon code is defined as follows:

$$GRS_{\lambda, 2k}(\vec{\pi}, \vec{c}) = \{(c_1 f(\pi_1), \ldots, c_\lambda f(\pi_\lambda)) : f(x) \in GF(q)[x] \text{ and } \deg(f) \leq 2k-1\}$$

In other words, a code $GRS_{\lambda, 2k}(\vec{\pi}, \vec{c})$ is the set of polynomials f over $GF(q)$ having degree strictly smaller than 2k evaluated over the points $\vec{\pi} = (\pi_1, \ldots, \pi_l)$ and scaled by the vector $\vec{c}$. When $\vec{c} = (1, 1, \ldots, 1)$, one simply speaks of Reed-Solomon codes.

Problem to be Solved

The aim of the present application is a new non-black-box traitor tracing mechanism for Boneh-Franklin and related schemes. Due to its algorithmic complexity, the original traitor tracing procedure, as it was described by Boneh and Franklin, is limited to the systems of about 10'000 users in a practical scenario on a common desktop computer available in 2007.

The benefit of the present application is the possibility to perform key tracing in systems up to several billions of users in a fraction of time of the original tracing mechanism on the same computer configuration.

Known Traitor Tracing Mechanism

The original non-black-box tracing algorithm, as it was proposed by Boneh and Franklin in [6], is described in this section. It assumes that the party which is performing the tracing operation somehow obtained the traceable part $\vec{d} = (d_1, \ldots, d_{2k})^T$ of a pirate private key which consists of 2k elements in $Z/qZ$, where k is the maximum coalition size defined before the deployment of the system and q is a large prime number, typically 160 bits but at least 128 bits (in which case $q > 2^{127}$). We recall that the system consists of $\lambda$ receivers and we will denote by H the parity-check matrix of the generalized Reed-Solomon code chosen at the system setup time. Note that the traceable part $\vec{d} = (d_1, \ldots, d_{2k})^T$ of a pirate key can be considered as being a syndrome of the generalized Reed-Solomon code. In the first step of the original algorithm the traceable part of the pirate private key is reversed to a "noisy" vector $\vec{v} = (v_1, \ldots, v_\lambda)$ of $\lambda$ elements, such that $\vec{v} \cdot H = \vec{d}$ with $H = [\gamma^{(1)}, \gamma^{(2)}, \ldots, \gamma^{(\lambda)}]^T$ being the parity-check matrix of a generalized Reed-Solomon code; this step can be performed by solving a system of 2k linear equations in $\lambda$ unknowns. This step is not required in the case where the matrix B is normalized. The second step is to solve a system of $\lambda$ linear equations with $\lambda$ unknowns and obtain the "corrected" vector $\vec{v}_c = (v_1^c, \ldots, v_\lambda^c)^T = (f(\pi_1), \ldots, f(\pi_\lambda))^T$, where $f(x) \in GF(q)[x]$ and $\deg(f) \leq \lambda - 2k - 1$, by observing that $\vec{v}_c = \vec{v}$ in all but k positions. The identities of the traitors are revealed by subtracting $\vec{v} - \vec{v}_c$; the base point or, then reveals the index i of the key used in the coalition. In other words, it is the i-th non-zero element of the resulting vector.

The running time of the above algorithm is in $O(\lambda^3)$, i.e. it depends on the cube of the number $\lambda$ of users in the system. Such running time is prohibitive in practice as soon as $\lambda$ becomes larger than 10,000. Even though the complexity of the optimized version of the tracing procedure using the so-called Berlekamp-Welch described in [9] is in $O(\lambda^2)$, the tracing capacity in terms of number of users in the system still remains heavily limited.

BRIEF DESCRIPTION OF THE INVENTION

The aim is achieved thanks to a method to trace traceable parts $\vec{d}=(d_1, \ldots, d_{2k})^T$ of original private keys in a public-key cryptosystem consisting of one public key and $\lambda$ corresponding private keys, a private key being formed by at least a traceable array of 2k elements forming a syndrome of a generalized Reed-Solomon code with parameters $(\lambda, \lambda-2k)$ defined by the base points $\vec{\pi}=(\pi_1, \ldots, \pi_\lambda)$ and a scaling vector $\vec{c}=(c_1, c_2, \ldots, c_\lambda)$, comprising the steps of:

obtaining the traceable part $\vec{d}=(d_1, \ldots, d_{2k})^T$ of a rogue private key where the array of 2k elements is a linear combination of arrays of 2k elements belonging to at least two original private keys such that the sum of the coefficients of the linear combination is equal to 1 mod q, applying a Berlekamp-Massey algorithm on the traceable part $\vec{d}=(d_1, \ldots, d_{2k})^T$ of the rogue private key, to obtain the k coefficients of an error-locator polynomial, applying the Chien's search algorithm to the error-locator polynomial, to obtain roots of the error-locator polynomial, determining the base points of the traceable part of the original private keys by computing the arithmetic inverse of each root, these base points allowing to uniquely determine the private key.

BRIEF DESCRIPTION OF THE FIGURE

The method of the invention will be better understood thank to the attached FIGURE in the various steps of the invention are illustrated by block diagrams.

DETAILED DESCRIPTION OF THE INVENTION

Fast Traitor Tracing

Figure 1:
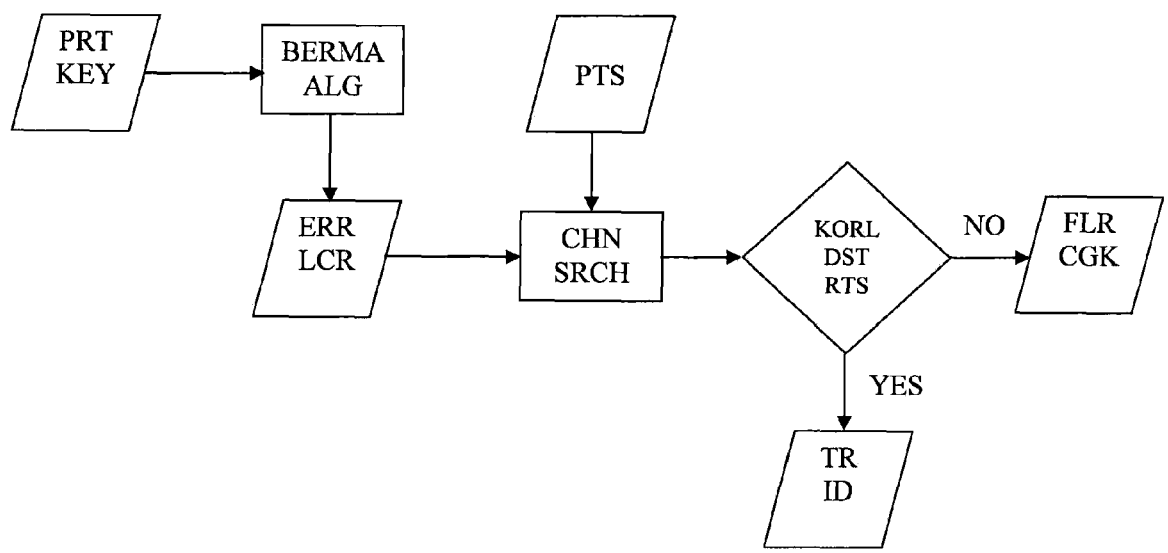

The new fast tracing algorithm is now presented. As in the original scheme, prior to the system deployment, the maximum coalition size k and the number of users $\lambda$ are fixed, as well as the parameters $\vec{\pi}$ and $\vec{c}$ of the generalized Reed-Solomon code.

Given $n \leq k$ distinct traitor keys in the coalition T, a pirate key can be written as $$\vec{d} = \begin{pmatrix} d_1 \\ d_2 \\ \vdots \\ d_{2k} \end{pmatrix} = \sum_{\substack{j=1 \\ i \in T}}^{n} \xi_j b_{i_j} \vec{\gamma}^{(i_j)}$$

where $b_{i_j}$ are constants depending on the identity i, and where $$\sum_{j=1}^{n} \xi_j = 1 \mod q \quad (1)$$

The goal of the algorithm is to find the subset T.

The new fast traitor tracing mechanism that is the subject of the present invention will take 2k elements as input and will output the identities of the traitors as long as there are at most k traitor keys in the representation $\vec{d}$. The new proposed algorithm consists of 2 steps:

Berlekamp-Massey algorithm [7] accepts 2k elements $d_1$, $d_2, \ldots, d_{2k} \in Z/qZ$ as input and outputs k elements $\Lambda_1$, $\Lambda_2, \ldots, \Lambda_k \in Z/qZ$, the coefficients of the so-called error locator polynomial $\Lambda(x)=1+\Lambda_1 x+\Lambda_2 x^2+\ldots+\Lambda_k x^k$.

Chien's search [8] accepts k elements $\Lambda_1, \Lambda_2, \ldots, \Lambda_k \in Z/qZ$ and a vector of points $\vec{\pi}=(\pi_1, \ldots, \pi_\lambda)$ of size $\lambda$ as input and it outputs the $n \leq k$ roots of the error locator polynomial $\Lambda(x)$. The arithmetic inverse of each root then gives the respective base point of all the traitor keys $i \in T$.

The actual identity of the traitors is given through a identity-base-point relations table which explicitly maps the identity of a user to the corresponding base point of a given private key and vice-versa.

The first advantage of the proposed method is that the first step of the algorithm is independent of the number of users $\lambda$ in the system and only depends on the coalition size k which is negligible compared to the number of users in the system $\lambda$ in terms of complexity. The second step is linear in $\lambda$, but involves only light computations.

The second advantage of the current invention is that the necessary information about the coalition of traitors is retrieved directly from the traceable part $\vec{d}=(d_1, \ldots, d_{2k})^T$ of the rogue pirate key by applying the Berlekamp-Massey algorithm. Hence the tracing procedure can be performed considerably faster than in the original Boneh-Franklin proposal. The overall complexity of the new algorithm is in $O(\lambda)$, i.e. it is linear in $\lambda$.

Field of Application

The present invention can be applied, but is not limited, to the Pay-TV and other digital media distribution systems, such as CDs and DVDs. The data is to be encrypted using the system's public key and each user is given a distinct private traceable key by means of incorporation of the abovementioned private key parts in tamper-proof memory of an electronic device, also referred as "receiver" (Set-Top Box, mobile terminal or an optical disc player).

Upon purchase of one or several of the legal receivers or players an unlawful user, also referred as "traitor", would try to extract the private key information by means of reverse engineering, that is taking the receiver apart and discovering the key material through analysis of receiver's function and operations. The traitor might then build his own receiver or player which utilizes a combination of the retrieved private keys in order to decrypt the protected media. He may sell it or he may put it on the Internet if the receiver can be simulated by a software program executing on a personal computer which will then result in the propagation of piracy.

The media distribution authority, after locating and recovering the abovementioned pirate device and extracting the pirate key, will run the fast traitor tracing mechanism which is subject to the current disclosure. Referring to the FIG. 1 for illustrative purposes, the Berlekamp-Massey algorithm represented by the block BERMA-ALG will be executed on the traceable part of the pirate key PRT-KEY which consists of 2k elements and it will output the error locator polynomial ERR-LCR consisting of k coefficients. The Chien's search CHN-SRCH will take as input the k coefficients of the error locator polynomial and the vector of $\lambda$ elements PTS $\vec{\pi}=(\pi_1, \ldots, \pi_\lambda)$ which represents all the user identities present in the system. Proceeding to the decision diamond KORL-DST-RTS, it is determined whether the error locator polynomial has k or fewer roots, which corresponds to the pirate private key being formed by k or less original private keys according to (1). In the case where the error locator polynomial has k or less roots, the logic flows from decision diamond KORL-DST-RTS to output the identities of the traitors TR-ID by searching the modular inverse of the roots of the error locator polynomial against the identity-base-points relations table. Given the root p of the error location polynomial the base point art $\pi_i$ computed using the extended Euclidean algorithm, i.e. $\pi_i$-$\rho^{-1}$ mod q. As another possibility, we might include the base point inverse into the identity-base-point relations table to avoid the computation of the modular inverse. In the contrary case where the error locator polynomial has more than k roots, the algorithm is unable to determine the identities of the traitors and outputs the fact FLR-CGK that there were more than k original private keys combined into the pirate private key.

The main advantage of the current invention is its speed, comparing to the previously proposed art, meaning that a system implementing the fast traitor tracing can be deployed in a scenario with several hundreds of millions of receivers, which seems deeply appropriate to the digital media distribution systems such as those using optical discs (DVDs and CDs) and Pay-TV systems, whereas previously known art [6] could only be used in a scenario with 10,000 of users which may be seen as a severe limiting factor. In comparison with [4], which may be also used to protect digital data on optical discs, the fast traitor tracing uses the non-black-box deterministic tracing approach. It means that first of all, the key material is to be extracted from the receiver by media distribution authority by means of reverse engineering. The advantage of this approach is the deterministic nature of the fast traitor tracing mechanism, specifically until there is a combination of k or less rogue keys in the pirate receiver, the identities of the traitors will be discovered with probability 1. On the contrary, the method proposed in [4], under some circumstances, will not be able to output the exact identities of the traitors.

After the traitors being determined and assuming a link between the traitor and the purchased receivers, legal sanctions can be taken to prevent the distribution of pirate keys and/or rogue receivers in public. Other actions which may be more technical in nature can also be executed to avoid that rogue receivers further access to protected media. For instance, the identities of the traitors can be used by the media distribution authority in the context of a broadcast encryption system to revoke the traitors and the pirate receivers.

REFERENCES

[1] A. Fiat and M. Naor, "*Broadcast encryption*", CRYPTO'93, Lecture Notes in Computer Science 773, pp. 480491, Springer-Verlag, 1994.

[2] B. Chor, A. Fiat and M. Naor, "*Tracing Traitors*", CRYPTO'94, Lecture Notes in Computer Science 839, pp. 257-270, Springer-Verlag, 1994.

[3] J. Lotspiech, D. Naor and M. Naor, "Method for broadcast encryption and key revocation of stateless receivers", U.S. Pat. No. 7,039,803.

[4] J. Lotspiech, D. Naor and M. Naor, "Method for tracing traitor receivers in a broadcast encryption system", U.S. Pat. No. 7,010,125.

[5] A. Kiayias and S. Pehlivanoglu, "*Pirate evolution: how to make the most of your traitor Keys*", CRYPTO'07, Lecture Notes in Computer Sciences 4622, pp. 448-465, Springer-Verlag, 2007.

[6] D. Boneh and M. Franklin, "An efficient public-key traitor tracing scheme", CRYPTO'99, Lecture Notes in Computer Sciences 1666, pp. 338-353, Springer-Verlag, 1999.

[7] J. Massey, "Shift-register synthesis and BCH decoding", IEEE Transactions on Information Theory, 15(1): 122-127, 1969

[8] Robert T. Chien, "Cyclic Decoding Procedure for the Bose-Chaudhuri-Hocquenghem codes", IEEE Transactions on Information Theory, IT-1 0:357-363, 1964

[9] L. Welch and E. Berlekamp, "Error correction for algebraic block codes", U.S. Pat. No. 4,633,470, 1986

The invention claimed is:

1. Method to trace traceable parts $\vec{d}=(d_1, \ldots, d_{2k})^T$ of original private keys in a public-key cryptosystem consisting of one public key and $\lambda$ corresponding private keys, a private key being formed by at least a traceable array of 2k elements forming a syndrome of a generalized Reed-Solomon code with parameters $(\lambda,\lambda\text{-}2k)$ defined by the base points $\vec{\pi}=(\pi_1, \ldots, \pi_\lambda)$ and a scaling vector $\vec{c}=(c_1, c_2, \ldots, c_\lambda)$, comprising the steps of:

obtaining the traceable part $\vec{d}=(d_1, \ldots, d_{2k})^T$ of a rogue private key where the array of 2k elements is a linear combination of arrays of 2k elements belonging to at least two original private keys such that the sum of the coefficients of the linear combination is equal to 1 mod q, applying a Berlekamp-Massey algorithm on the traceable part $\vec{d}=(d_1, \ldots, d_{2k})^T$ of the rogue private key, to obtain the k coefficients of the error-locator polynomial, applying the Chien's search algorithm to the error-locator polynomial, to obtain roots of the error-locator polynomial, determining the base points of the traceable part of the original private keys by computing the arithmetic inverse of each root, these base points allowing to uniquely determine the private key identity.

2. Method of claim 1, wherein the generalized Reed-Solomon codeword is defined over a finite field of at least $2^{127}$ elements.

3. Method of claim 1, wherein each original private key is assigned to a given identity, this method further comprising the steps of:

storing for each private key, the base point $\pi_i$ and the corresponding identity i, retrieving the identities of the private keys based on the recovered based point and the corresponding stored identities.

4. Method of claim 2, wherein each original private key is assigned to a given identity, this method further comprising the steps of:

storing for each private key, the base point ax and the corresponding identity i, retrieving the identities of the private keys based on the recovered based point and the corresponding stored identities.

* * * * *